US012080473B2

(12) United States Patent
Rackson

(10) Patent No.: US 12,080,473 B2
(45) Date of Patent: Sep. 3, 2024

(54) ELECTRICAL TRANSFORMER

(71) Applicant: NORTHROP GRUMMAN SYSTEMS CORPORATION, Falls Church, VA (US)

(72) Inventor: Gary M. Rackson, Pasadena, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 18/449,573

(22) Filed: Aug. 14, 2023

(65) Prior Publication Data

US 2023/0402223 A1 Dec. 14, 2023

Related U.S. Application Data

(62) Division of application No. 16/808,950, filed on Mar. 4, 2020, now Pat. No. 11,749,451.

(51) Int. Cl.

| | |
|---|---|
| ***H01F 27/32*** | (2006.01) |
| ***H01F 27/24*** | (2006.01) |
| ***H01F 27/28*** | (2006.01) |
| ***H01F 41/063*** | (2016.01) |
| ***H01F 41/12*** | (2006.01) |

(52) U.S. Cl.

CPC ............. *H01F 27/32* (2013.01); *H01F 27/24* (2013.01); *H01F 27/2823* (2013.01); *H01F 41/063* (2016.01); *H01F 41/12* (2013.01)

(58) Field of Classification Search

CPC ........ H01F 27/32; H01F 41/063; H01F 27/24; H01F 27/2823; H01F 41/12

See application file for complete search history.

(56) References Cited

U.S. PATENT DOCUMENTS

| | | | | |
|---|---|---|---|---|
| 4,592,133 | A * | 6/1986 | Grimes | H01F 41/02 29/605 |
| 4,631,511 | A | 12/1986 | Sylvester, Jr. et al. | |
| 5,012,125 | A * | 4/1991 | Conway | H01F 27/34 336/229 |
| 5,204,650 | A * | 4/1993 | Nemoto | H10N 60/355 505/879 |
| 6,087,922 | A | 7/2000 | Smith | |
| 8,704,193 | B1 * | 4/2014 | Kholomeev | H01F 38/14 250/396 R |
| 2004/0257187 | A1 * | 12/2004 | Drummond | H01F 30/06 336/61 |
| 2008/0071260 | A1 * | 3/2008 | Shores | A61B 18/1206 606/34 |
| 2011/0198955 | A1 | 8/2011 | Platon et al. | |
| 2014/0224998 | A1 * | 8/2014 | Kholomeev | H01J 49/00 323/247 |
| 2016/0064470 | A1 * | 3/2016 | Mihailovich | H01L 23/645 438/3 |
| 2018/0286577 | A1 * | 10/2018 | Renteria | H01F 27/2823 |

* cited by examiner

*Primary Examiner* — Michael P McFadden

(74) *Attorney, Agent, or Firm* — Tarolli, Sundheim, Covell & Tummino LLP

(57) ABSTRACT

In some examples, an isolation transformer can include a first wire having a first insulation thickness and a second wire having a second insulation thickness that is different than the first insulation thickness. The isolation transformer can further include a plurality of magnetic cores of magnetic material that can be configured to surround portions of each of the first and second wires along respective circumferences of the first and second wires to provide the isolation transformer.

4 Claims, 4 Drawing Sheets

ELECTRICAL TRANSFORMER

RELATED APPLICATIONS

This application is a divisional application claiming priority from U.S. patent application Ser. No. 16/808,950, filed Mar. 4, 202, which is incorporated herein in its entirety.

GOVERNMENT INTEREST

The invention was made under Government Contract. Therefore, the US Government has rights to the invention as specified in that contract.

TECHNICAL FIELD

The present disclosure relates to transformers. More particularly, the present disclosure relates to an isolation transformer constructed without potting or encapsulation materials.

BACKGROUND

An isolation transformer is a type of transformer that can be used to transfer electrical power or signals from a source to a device (e.g., a circuit, machine, electronics, etc.) while isolating the device from the source. Isolation transformers provide galvanic isolation and can be used to protect against electrical shock or damage and to suppress electrical noise in sensitive devices.

SUMMARY

In an example, an isolation transformer can include a first wire having a first insulation thickness and a second wire having a second insulation thickness that is different than the first insulation thickness. The isolation transformer can further include a plurality of magnetic cores of magnetic material that can be configured to surround portions of each of the first and second wires along respective circumferences of the first and second wires to provide the isolation transformer.

In another example, a method for forming an isolation transformer can include passing a loop forming portion of a primary side wire having a first wire thickness through a plurality of magnetic cores, passing a loop forming portion of a secondary side wire having a second wire thickness through the plurality of magnetic cores and manipulating each loop forming portion of the primary and secondary side wires passed through the plurality of magnetic cores to form respective primary and secondary side wire loop portions to provide the isolation transformer.

In a further example, an isolation transformer that is free of a potting or encapsulation material can include a primary side wire having a first insulation thickness that can define a voltage isolation level for the isolation transformer from a primary electrical source or a load and a secondary side wire having a second insulation thickness that can define a voltage isolation level of the isolation transformer from a secondary electrical source or the load that is different than the first insulation thickness. The isolation transformer can further include a plurality of magnetic cores of magnetic material surrounding respective portions of each of the primary and secondary side wires along respective circumferences of the primary and secondary side wires to provide the isolation transformer.

DETAILED DESCRIPTION

Figure 1:
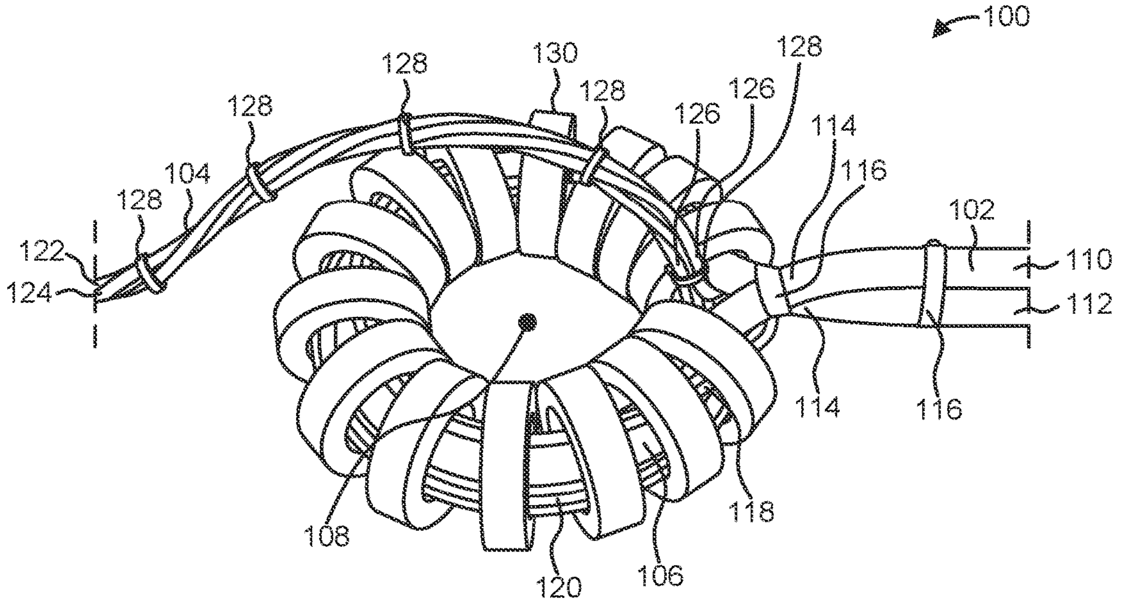
FIG. 1 illustrates an example of an isolation transformer.

The present disclosure relates to an isolation transformer. Potted or encapsulated isolation transformers are constructed with primary and secondary windings being placed on a split or separate bobbins to provide physical separation between the windings. The split or separate bobbin is placed around a magnetic material (e.g., an iron core) and the assembly is potted with an insulating material (e.g., by placing the assembly in a potting cup then pouring a potting compound into the potting cup). An isolation level or rating (e.g., a voltage isolation) of the potted isolation transformer depends on characteristics of materials used to construct the transformer, such as bobbin materials and thickness, wire routing, spacing between windings, and potting materials. Defects in the materials, such as cracks, voids or inclusions can cause transformer failures. Thus, any de-bonding or de-lamination that is weakness in the insulation material (e.g., from aging and electrical and/or mechanical stresses) can result in a transformer failure condition (e.g., an arc path condition). Moreover, potted isolation transformers typically exhibit poor magnetic coupling and high inductance leakage due to the physical separation of the primary and secondary windings, which can be undesirable in some transformer applications, such as switching topologies.

In some examples, an isolation transformer is provided that has similar or substantially similar (e.g., within about 5% to about 10% or less) voltage isolation requirements as potted isolation transformers without the use of a potting material. Isolation transformer applications are described herein with respect to electromechanical conversion circuits, such as direct-to-direct (DC-to-DC) converters, however, the examples described herein should not be limited only to DC-to-DC converters. The isolation transformers of the present disclosure can be used in any application wherein electrical power is transferred from a given circuit point (e.g., a source, a driver circuit, etc.) to another circuit point (e.g., a load, an output rectifier, etc.). As such, in some examples, the isolation transformers of the present disclosure can be employed in a switch mode power supply (SMPS). The SMPS can be implemented according to a variety of different topologies including flyback, forward, buck, boost and buck-boost.

By way of example, an isolation transformer includes a primary side wire and a secondary side wire. The primary side wire can have a first insulation thickness. The secondary side wire can have a second insulation thickness that can be different than the first insulation thickness. Thus, in some examples, the primary side wire can be referred to as a high voltage (HV) rated wire and the secondary side wire can be referred to as a low voltage (LV) rate wire. The isolation transformer can include a plurality of magnetic cores. A number and type of magnetic cores can be based on a particular application in which the isolation transformer is to be employed. Thus, in some examples, the number of magnetic cores and/or magnetic material type selected for the isolation transformer can be based on signal voltages, currents and/or operating frequencies.

In some examples, during formation of the isolation transformer, a portion of the primary and secondary side wires can be passed through each of the plurality of magnetic cores. Each portion of the primary and secondary side wires passed through each of the plurality of magnetic cores can be manipulated (e.g., via a machine, by hand of a user, etc.) to form respective primary and secondary side wire loop portions. Each of the magnetic cores can radially surround respective portions of the primary and secondary side wires along respective circumferences of the primary and secondary side wires. In other examples, the primary and secondary side wire loop portions can be formed and a plurality of split shaped magnetic cores can be configured (e.g., assembled) to radially surround the primary and secondary side wire loop portions.

By way of example, the plurality of split shaped magnetic cores can include c-cores, split bead cores, or split toroidal cores. The term "loop" as used herein, in some examples, can correspond to a closed curve that can have initial and final points coinciding in (or) at a fixed point (or area). Thus, in some examples, each portion of the primary and secondary side wires can be manipulated to form closed loop configurations resembling a circle, a square, an oblong, etc. By utilizing less insulated wiring for a secondary side of the isolation transformer, the secondary side wire can be interleaved relative to the primary side wire during formation of the isolation transformer. In some examples the secondary side wire is a multifilar secondary side wire (e.g., a bifilar secondary side wire). In additional examples, a number of turns on each winding described herein does not need to be the same and can be chosen to meet application specific turn ratio requirements.

Although examples are presented herein wherein the isolation transformer is configured with primary and secondary side wires, the examples herein should not be construed and/or limited to two set of wires. In other examples, the isolation transformer described herein can support a plurality of additional wires, such as a tertiary wire. As such, the winding techniques presented herein can include separate, interleaved, bifilar, and multifilar configurations (e.g., arrangements). In some examples, the primary and secondary side wires can be manipulated separately to form the respective primary and secondary side wire loop portions and the magnetic cores can be configured to radially surround the respective loop portions of the primary and secondary side wires along the respective circumferences of the primary and secondary side wires. In other examples, the plurality of wires can be manipulated to form respective side wire loop portions and the magnetic cores can be configured to radially surround the respective loop portions of the plurality of the wires along the respective circumferences of the plurality of wires. As used herein, the terms "primary" and "secondary" are used to identify coupling points of the isolation transformer, as described herein. Thus, the terms "primary" and "secondary" as used herein should not be not limited to identifying a source for the primary side wire and a load for the secondary side wire.

Accordingly, the isolation transformer can provide a voltage isolation similar or substantially similar as the potted isolation transformer for a given application without the need for a potting material. For example, the isolation transformer can be used in electromechanical conversion circuits as a replacement for potted isolation transformers. In some examples, the isolation transformer can be used for signal and radio-frequency (RF) applications. Moreover, the isolation transformer of the present disclosure exhibits stronger magnetic coupling and lower leakage in inductance due to a close proximity of the primary and secondary side wires in contrast to the potted isolation transformer.

FIG. 1 illustrates an example of an isolation transformer 100. The isolation transformer 100 can include a primary side wire 102 and a secondary side wire 104. Each of the primary and secondary side wires 102, 104 can include a conductive material surrounded by an insulating material. The type of insulating material surrounding the conductive materials can define a voltage rating of the primary and secondary side wires 102, 104. Thus, an insulation thickness of the insulating material surrounding the conductive materials of the primary and secondary side wires 102, 104 can define the voltage rating of each wire 102, 104. Each of the primary and secondary side wires 102, 104 can have a minimum bend radius that can be proportional to a wire diameter of each primary and secondary side wire 102, 104. In some examples, the minimum bend radius can describe a smallest radius to which a given wire (e.g., the primary and secondary side wire 102, 104) can be bent before the given wire gets kinked, damaged or loses structural integrity. By way of example, the minimum bend radius for each wire 102, 104 can be determined based on a cable outer diameter of a corresponding wire 102, 104 and a cable multiplier for a given cable type of the corresponding wire 102, 104.

In some examples, the primary side wire 102 can have a first insulation thickness, a first bend radius, and a first wire length. The length of the primary side wire 102 can be selected, such that there can be sufficient length to form a primary side wire loop portion 106, as described herein. The first insulation thickness of the primary side wire 102 can define a voltage isolation level of the isolation transformer 100. Thus, the primary side wire 102 can specify the voltage isolation level (e.g., an isolation barrier) of the isolation transformer 100, such that the isolation transformer 100 can meet application specific requirements (e.g., similar to those as counterpart potted isolation transformers). Therefore, during formation of the isolation transformer 100, the primary side wire 102 can be selected with a given insulation thickness, such that the isolation transformer 100 can provide a similar or substantially similar (e.g., within about 5% to about 10% or less) level of voltage isolation as a potted isolation transformer.

In some examples, a portion of the primary side wire 102 (e.g., a loop forming portion of the primary side wire 102) can be manipulated to form the primary side wire loop portion 106. A radius of the primary side wire loop portion 106 can be less than or equal to the first bend radius of the primary side wire 102 relative to a loop center 108. In some examples, to form the primary side wire loop portion 106, the primary side wire 102 can be manipulated via a device, such as a loop forming device, by a user (e.g., by bending the primary side wire 102), etc. As illustrated in FIG. 1, the primary side wire 102 can include first and second end portions 110, 112. The first and second end portions 110, 112 can extend away from the primary side wire loop portion 106. The first and second end portions 110, 112 can be coupled to a circuit (not shown in FIG. 1). In some examples, the circuit can be a source circuit, such an alternating current (AC) power source circuit. In other examples, a different circuit can be coupled to the first and second end portions 110, 112.

By way of example, during formation of the isolation transformer 100, a pair of primary side loop tail portions 114 can be conjoined to form the primary side wire loop portion 106. Each primary side loop tail portion 114, in an example, can correspond to a surface portion (e.g., an area) of the primary side wire 102 that can be abutted against another surface portion of the primary side wire 102 to complete formation of the primary side loop portion 106. Thus, in some examples, the pair of primary side loop tail portions 114 can be conjoined by abutting different respective surface portions of the primary side wire 102 against each other in response to manipulating the portion of the primary side wire 102 into a loop arrangement to form the primary side wire loop portion 106.

In some examples, during formation of the isolation transformer 100, a first restraining device 116 can be used to restrain the pair of primary side loop tail portions 114 to retain the primary side wire loop portion 106 in the loop arrangement in response to conjoining the pair of primary side loop tail portions 114. Thus, the first restraining device 116 can cause the portion of the primary side wire 102 forming the primary side wire loop portion 106 to retain the loop arrangement by restraining the pair of primary side loop tail portions 114. Each restraining device 116 can include magnets, latches, lock/key pairs, hooks, hook and loop pairs (e.g., Velcro fasteners), adhesives (e.g., adhesive tapes), rings, hardware assembly (e.g., screws, bolts, lugs, nuts), zip-ties, etc. As illustrated in FIG. 1, the first and second end portions 110, 112 of the primary side wire 102 can extend away from the pair of primary side loop tail portions 114. In additional or alternative examples, a second restraining device 116 can be used to restrain the first and second end portions 110, 112 as these portions 110, 112 extend away from the pair of primary side loop tail portions 114.

In some examples, the secondary side wire 104 can have a second insulation thickness, a second bend radius, and a second wire length. The length of the secondary side wire 104 can be selected, such that there can be sufficient length to form secondary side wire loop portions 118, 120, as described herein. In some examples, the secondary side wire 104 has a greater wire length than the primary side wire 102. In further examples, the insulation of the secondary side wire 104 can be less than the insulation of the primary side wire 102. Thus, the second insulation thickness can be less than the first insulation thickness. By utilizing less insulated wiring for the secondary side wire 104, the secondary side wire 104 can be interleaved, bifilared or multi-filared relative to the primary side wire 102 (e.g., the primary side wire loop portion 106).

By way of example, the secondary side wire 104 can include a set of secondary side wires 104 and the set of secondary side wires 104 can be bifilared relative to the primary side wire 102 during formation of the isolation transformer 100. The set of secondary side wires 104 can include a first secondary side wire 104 and a second secondary side wire 104. In some examples, a portion of each of the first and second secondary side wires 104 can be formed into a respective loop corresponding to the secondary side wire loop portions 118, 120. In additional examples, a radius of each secondary side wire loop portion 118, 120 can be less than or equal to the second bend radius of a corresponding secondary side wire 104 relative to the loop center 108. In some examples, to form each secondary side wire loop portion 118, 120, each secondary side wire 104 can be manipulated (e.g., via a device, such as a loop forming device, by the user (e.g., by bending the first and second secondary side wires 104), etc.). As illustrated in FIG. 1, each of the secondary side wires 104 can include respective first and second end portions 122, 124. The respective first and second end portions 122, 124 of each secondary side wire 104 can extend away from a corresponding secondary side wire loop portion 118, 120. The respective first and second end portions 122, 124 can be coupled to an output circuit (not shown in FIG. 1).

By way of example, during formation of the isolation transformer 100, each respective pair of secondary side loop tail portions 126 of the first and second secondary side wires 104 can be conjoined to form the secondary side wire loop portions 118, 120, respectively. Each secondary side loop tail portion 126, in an example, can correspond to a surface portion (e.g., an area) of a respective secondary side wire 104 that can be abutted against another surface portion of the respective secondary side wire 104 to complete formation of the corresponding secondary side wire loop portion 118, 120. Thus, in some examples, the pair of secondary side loop tail portions 126 of the respective secondary side wire 104 can be conjoined by abutting different respective surface portions of the respective secondary side wire 104 against each other in response to manipulating a loop forming portion of the respective secondary side wire 104 into a loop arrangement to form the corresponding secondary side wire loop portion 118, 120.

In some examples, during formation of the isolation transformer 100, a first restraining device 128 can be used to restrain the pair of secondary side loop tail portions 126 of the respective secondary side wire 104 to retain each secondary side wire loop portion 118, 120 in a loop arrangement in response to conjoining the pair of secondary side loop tail portions 126 of the respective secondary side wire 104. The first restraining device 128 can cause the loop forming portion of the respective secondary side wire 104 forming the corresponding secondary side wire loop portion 118, 120 to retain the loop arrangement by restraining the pair of secondary side loop tail portions 126 of the respective secondary side wire 104. As illustrated in FIG. 1, the first and second end portions 122, 124 of the first and second secondary side wires 104 can extend away from a respective pair of secondary side loop tail portions 126.

In additional examples, a plurality of additional restraining devices 128 can be employing during formation of the isolation transformer 100 to restrain the first and second end portions 122, 124 of each secondary side wire 104, as these portions 122, 124 extend from the respective pair of secondary side loop tail portions 126. By way of example, FIG. 1 illustrates the restraining devices 128 as a zip-tie. In other examples, a different type of restraining device 128 can be employed (e.g., such as the first restraining device 116). In additional or alternative examples, during formation of the isolation transformer 100, the secondary side wire loop portions 118, 120 can be positioned adjacent to the primary side wire loop portion 106, such that the secondary side wire loop portions 118, 120 can be in close proximity or in physical contact with the primary side wire loop portion 106.

In some examples, the primary and secondary side wires 102, 104 can be selected with an insulation thickness based on isolation voltage requirements. For example, if a primary circuit or device (e.g., a voltage source) is at a high voltage potential and a secondary circuit or device (e.g., a load) is at a low voltage potential, then the secondary side wire 104 can be selected or constructed from a low voltage rated wire (e.g., wire having an insulation thickness that can support the low voltage potential with respect to the secondary side wire 104). In some examples, if the primary and secondary circuits or devices are at a high voltage potential, both primary and secondary side wires 102, 104 can be selected or constructed from a high voltage rated wire (e.g., wires having an insulation thickness that can support the high voltage potential with respect to the primary and secondary side wires 102, 104). Such example can result in a transformer magnetic structure (and any associated mounting or housing) being isolated from both primary and secondary potentials. Accordingly, the isolation voltage rating of the isolation transformer 100 can depend on the wire insulation ratings of the primary and secondary side wires 102, 104.

Continuing with the example of FIG. 1, the isolation transformer 100 can further include a plurality of magnetic cores 130. By way of example, FIG. 1 illustrates a plurality of toroidal loop magnetic cores. In other examples, different shaped magnet cores can be used, such as square shaped loop cores, or any type of magnetic core having an opening (e.g., a hollow opening) to allow for passing of the primary and secondary side wires 102, 104. As such, in some examples, the plurality of magnetic cores 130 can correspond to a plurality of loop shaped magnetic cores 130. A number of the plurality of magnetic cores 130 can be based on a particular application in which the isolation transformer 100 is to be employed. By way of example, as illustrated in FIG. 1, the isolation transformer 100 includes fourteen (14) loop (e.g., circular) shaped magnetic cores. Thus, in some examples, the number of the plurality of magnetic cores 130 and/or magnetic material type selected for the isolation transformer 100 can be based on signal voltages, currents and/or operating frequencies.

In some examples, during formation of the isolation transformer 100, each loop forming portion of the primary and secondary side wires 102, 104 can be manipulated to pass through each of the plurality of magnetic cores 130 to form a corresponding side wire loop portion, such as the primary side wire loop portion 106 and the secondary side wire loop portions 118, 120. Once passed through each of the plurality of magnetic cores 130, the first restraining devices 116, 128 can be used to restrain respective side loop tail portions 114, 126, and thus to retain the corresponding side wire loop portion in the loop arrangement. In some examples, at least some of the restraining devices 116, 128 can be omitted. As illustrated in FIG. 1, each of the magnetic cores 130 can radially surround a respective section of the primary and secondary side loop portions 106, 118, 120 along respective circumferences of the primary and secondary side wires 102, 104. In other examples, the primary side wire loop portion 106 and the secondary side wire loop portions 118, 120 can be formed and a plurality of split shaped magnetic cores can be configured (e.g., assembled) to radially surround the loop portions 106, 118, 120. Thus, in these examples, the plurality of split shaped magnetic cores can correspond to the plurality of magnetic cores 130. By way of example, the plurality of split shaped magnetic cores can include c-cores, split bead cores, or split toroidal cores.

Accordingly, in contrast to potted isolation transformers, the isolation transformer 100 can be easier to construct and can require less construction time, as the isolation transformer 100 does not need special equipment, molds or potting, as no potting material is required. Thus, the isolation transformer 100 can require less engineering hours to construct and an amount of time needed to verify that the isolation transformer 100 meets voltage isolation requirements. Therefore, qualification and factory acceptance testing (FAT) can be simplified since a level of voltage isolation for a particular application can be achieved via pre-verified wire isolation of the primary side wire 102. Accordingly, the isolation transformer 100 can provide similar or substantially similar (e.g., within about 5% to about 10% or less) voltage isolation level as a potted isolation transformer without use of potting materials.

Figure 2:
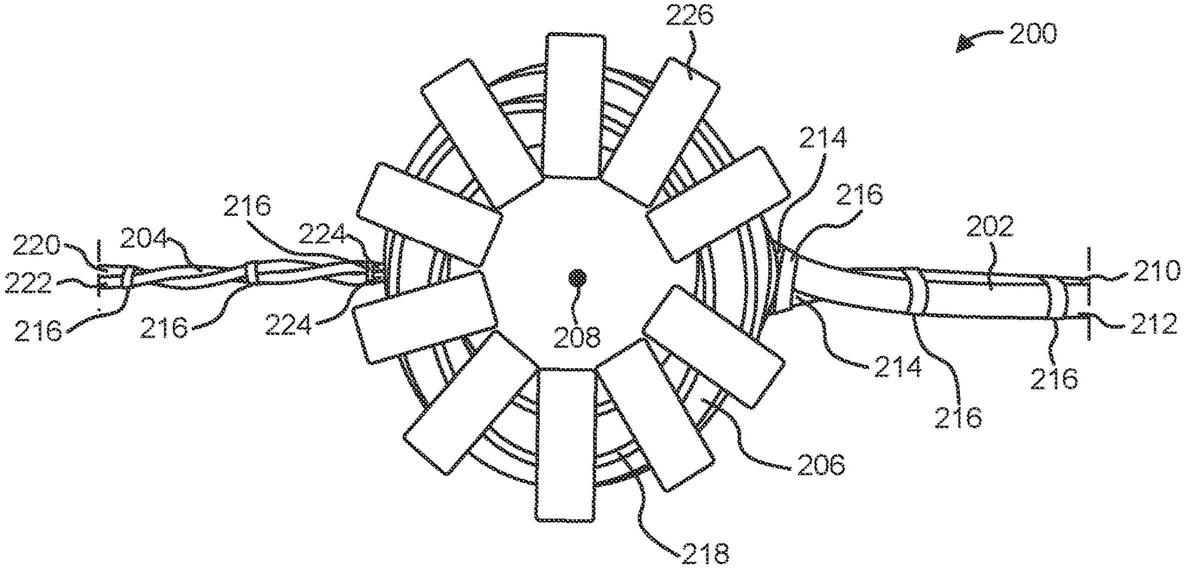
FIG. 2 illustrates another example of an isolation transformer.

FIG. 2 illustrates another example of an isolation transformer 200. The isolation transformer 200 can include a primary side wire 202 and a secondary side wire 204. Each of the primary and secondary side wires 202, 204 can include a conductive material surrounded by an insulating material. The type of insulating material surrounding the conductive materials can define a voltage rating for the primary and secondary side wires 202, 104. Thus, an insulation thickness of the insulating material surrounding the conductive materials of the primary and secondary side wires 202, 204 can define the voltage rating of each wire 202, 204. Each of the primary and secondary side wires 202, 204 can have a minimum bend radius that can be proportional to a wire diameter of each primary and secondary side wires 202, 204. In some examples, the minimum bend radius can describe a smallest radius to which a given wire (e.g., the primary and secondary side wire 202, 204) can be bent before the given wire gets kinked, damaged or loses structural integrity. By way of example, the minimum bend radius for each wire 202, 204 can be determined based on a cable outer diameter of a corresponding wire 202, 204 and a cable multiplier for a given cable type of the corresponding wire 202, 204.

In some examples, the primary side wire 202 can have a first insulation thickness, a first bend radius, and a first wire length. The length of the primary side wire 202 can be selected, such that there can be sufficient length to form a primary side wire loop portion 206, as described herein. The first insulation thickness of the primary side wire 202 can define a voltage isolation level for the isolation transformer 200. Thus, the primary side wire 202 can specify the voltage isolation level (e.g., an isolation barrier) for the isolation transformer 200, such that the isolation transformer 200 can meet application specific requirements (e.g., similar to those as potted isolation transformers). Therefore, during formation of the isolation transformer 200, the primary side wire 202 can be selected with a given insulation thickness, such that the isolation transformer 200 can provide a similar or substantially similar (e.g., within about 5% to about 10% or less) level of voltage isolation as a potted isolation transformer.

In some examples, a portion of the primary side wire 202 (e.g., a loop forming portion of the primary side wire 202) can be manipulated to form the primary side wire loop portion 206. A radius of the primary side wire loop portion 206 can be less than or equal to the first bend radius of the primary side wire 102 relative to a loop center 208. In some examples, to form the primary side wire loop portion 206, the primary side wire 202 can be manipulated via a device, such as a loop forming device, by a user (e.g., by bending the primary side wire 102), etc. As illustrated in FIG. 2, the primary side wire 202 can include first and second end portions 210, 212. The first and second end portions 210, 212 can extend away from the primary side wire loop portion 206. The first and second end portions 210, 212 can be coupled to a circuit (not shown in FIG. 2). In some examples, the circuit can be a source circuit, such an alternating current (AC) power source circuit. In other examples, a different circuit can be coupled to the first and second end portions 210, 212.

By way of example, during formation of the isolation transformer 200, a pair of primary side loop tail portions 214 of the primary side wire 202 can be conjoined to form the primary side wire loop portion 206. Each primary side loop tail portion 214, in an example, can correspond to a surface portion (e.g., an area) of the primary side wire 202 that can be abutted against another surface portion of the primary side wire 202 to complete formation of the primary side wire loop portion 206. Thus, in some examples, the pair of primary side loop tail portions 214 can be conjoined by abutting different respective surface portions of the primary side wire 202 against each other in response to manipulating the loop forming portion of the primary side wire 202 into a loop arrangement to form the primary side wire loop portion 206. In some examples, during formation of the isolation transformer 200, one or more restraining devices 216 can be employed. A first restraining device 216 can be used to restrain the pair of primary side loop tail portions 214 to retain the primary side wire loop portion 206 in the loop arrangement in response to conjoining the pair of primary side loop tail portions 214. Thus, the first restraining device 216 can cause the portion of the primary side wire 202 forming the primary side wire loop portion 206 to retain the loop arrangement by restraining the pair of primary side loop tail portions 214. As illustrated in FIG. 2, the first and second end portions 210, 212 of the primary side wire 202 can extend away from the pair of primary side loop tail portions 214. In additional or alternative examples, second and third restraining devices 216 can be used to restrain the first and second end portions 210, 212 as these portions 210, 212 extend away from the pair of primary side loop tail portions 214.

In some examples, the secondary side wire 204 can have a second insulation thickness, a second bend radius, and a second wire length. The length of the secondary side wire 204 can be selected, such that there can be sufficient length to form a plurality of secondary side wire loop portions 218, as described herein. In some examples, the secondary side wire 204 has a greater wire length than the primary side wire 202. In further examples, the insulation of the secondary side wire 204 can be less than the insulation of the primary side wire 202. Thus, the second insulation thickness can be less than the first insulation thickness. By utilizing less insulated wiring for the secondary side wire 204, a portion of the secondary side wire 204 can be interleaved relative to the primary side wire loop portion 206, as illustrated in FIG. 2.

In some examples, portions of the secondary side wire 204 (e.g., loop forming portions of the secondary side wire 204) can be formed into loop arrangements corresponding to the plurality of secondary side wire loop portions 218. A radius of each of plurality of secondary side wire loop portions 218 can be less than or equal to the second bend radius of the secondary side wire 204 relative to the loop center 208. In some examples, to form each of the plurality of secondary side wire loop portions 218, the secondary side wire 104 can be manipulated (e.g., via a device, such as a loop forming device, by the user (e.g., by bending the secondary side wire 204), etc.). As illustrated in FIG. 2, the secondary side wire 204 can include respective first and second end portions 220, 222. The respective first and second end portions 220, 222 of secondary side wire 204 can extend away from the plurality of secondary side wire loop portions 218. The respective first and second end portions 220, 222 can be coupled to an output circuit (not shown in FIG. 2).

By way of example, during formation of the isolation transformer 200, a pair of secondary side loop tail portions 224 can be respectively conjoined to form the plurality of secondary side wire loop portions 218. Each secondary side loop tail portion 224, in an example, can correspond to a surface portion (e.g., an area) of the secondary side wire 204 that can be abutted against another surface portion of the secondary side wire 204 to complete formation of the plurality of secondary side wire loop portions 218. Thus, in some examples, the pair of secondary side loop tail portions 224 of the secondary side wire 204 can be conjoined by abutting different respective surface portions of the secondary side wire 204 against each other in response to manipulating the loop forming portion of the respective secondary side wire 204 into the plurality of loop arrangements corresponding to the plurality of secondary side wire loop portions 218.

In some examples, during formation of the isolation transformer 200, a fourth restraining device 216 can be used to restrain the pair of secondary side loop tail portions 224 to retain the plurality of secondary side wire loop portions 218 in the loop arrangement in response to conjoining the pair of secondary side loop tail portions 224. The fourth restraining device 216 can cause the loop forming portions of the secondary side wire 104 forming the plurality of secondary side wire loop portions 218 to retain respective loop arrangements by restraining the pair of secondary side loop tail portions 224 of the secondary side wire 204.

As illustrated in FIG. 2, the first and second end portions 220, 222 of the secondary side wire 204 can extend away from the pair of secondary side loop tail portions 224. In additional examples, a fifth and sixth restraining device 216 can be employed during formation of the isolation transformer 200 to restrain the first and second end portions 220, 222 of the secondary side wire 104, as these end portions 220, 224 extend from the pair of secondary side loop tail portions 224. By way of example, FIG. 2 illustrates the one or more restraining devices 216 as an adhesive (e.g., an adhesive tape). In other examples, a different type of restraining device 216 can be employed (e.g., such as the restraining device 128, as illustrated in FIG. 1). In additional or alternative examples, during formation of the isolation transformer 200, the plurality of secondary side wire loop portions 218 can be positioned adjacent to the primary side wire loop portion 206, such that at least some of the plurality of secondary side wire loop portions 218 can be in close proximity or in physical contact with the primary side wire loop portion 206.

In some examples, the primary and secondary side wires 202, 204 can be selected with an insulation thickness based on isolation voltage requirements. For example, if a primary circuit or device (e.g., a voltage source) is at a high voltage potential and a secondary circuit or device (e.g., a load) is at a low voltage potential, then the secondary side wire 204 can be selected or constructed from a low voltage rated wire (e.g., wire having an insulation thickness that can support the low voltage potential with respect to the secondary side wire 204). In some examples, if the primary and secondary circuits or devices are at a high voltage potential, both primary and secondary side wires 202, 204 can be selected or constructed from a high voltage rated wire (e.g., wires having an insulation thickness that can support the high voltage potential with respect to the primary and secondary side wires 202, 204). Such example can result in a transformer magnetic structure (and any associated mounting or housing) being isolated from both primary and secondary potentials. Accordingly, the isolation voltage rating of the isolation transformer 200 can depend on the wire insulation ratings of the primary and secondary side wires 202, 204.

Continuing with the example of FIG. 2, the isolation transformer 200 can further include a plurality of magnetic cores 226. By way of example, FIG. 2 illustrates a plurality of toroidal loop magnetic cores. In other examples, different shaped magnet cores can be used, such as square shaped loop cores, or any type of magnetic core having an opening to allow for passing of the primary and secondary side wires 202, 204. Thus, in some examples, the plurality of magnetic cores 226 can correspond to a plurality of loop shaped magnetic cores. A number of the plurality of magnetic cores 226 can be based on a particular application in which the isolation transformer 200 is to be employed. By way of example, as illustrated in FIG. 2, the isolation transformer 200 includes ten (10) loop (e.g., circular) shaped magnetic cores 226. Thus, in some examples, the number of the plurality of magnetic cores 226 and/or magnetic material type selected for the isolation transformer 100 can be based on signal voltages, currents and/or operating frequencies.

In some examples, during formation of the isolation transformer 200, each loop forming portion of the primary and secondary side wires 202, 204 can be manipulated to pass through each of the plurality of magnetic cores 226 to form a corresponding side wire loop portion, such as the primary side wire loop portion 206 and the plurality of secondary side wire loop portions 218. Once passed through each of the plurality of magnetic cores 226, the first and fourth restraining devices 216 can be used to restrain respective side loop tail portions 214, 224. In other examples, the primary side wire loop portion 206 and the plurality of secondary side wire loop portions 218 can be formed and a plurality of split shaped magnetic cores can be configured (e.g., assembled) to radially surround the loop portions 206, 218. Thus, in these examples, the plurality of split shaped magnetic cores can correspond to the plurality of magnetic cores 226. By way of example, the plurality of split shaped magnetic cores can include c-cores, split bead cores, or split toroidal cores. In some examples, the first and fourth restraining devices 216 or at least some of the restraining devices 216 can be omitted. As illustrated in FIG. 2, each of the plurality of magnetic cores 226 can radially surround a respective section of the primary and secondary side wire loop portions 206, 218 along respective circumferences of the primary and secondary side wires 202, 204.

Accordingly, in contrast to potted isolation transformers, the isolation transformer 200 can be easier to construct and can require less construction time, as the isolation transformer 200 does not need special equipment, molds or potting, as no potting material is required. Thus, the isolation transformer 200 can require less engineering hours to construct and an amount of time needed to verify that the isolation transformer 200 meets voltage isolation requirements. Therefore, qualification and FAT can be simplified since a level of voltage isolation for a particular application can be achieved via pre-verified wire isolation of the primary side wire 202. Accordingly, the isolation transformer 200 can provide similar or substantially similar (e.g., within about 5% to about 10% or less) voltage isolation level as a potted isolation transformer without use of potting materials.

Figure 3:
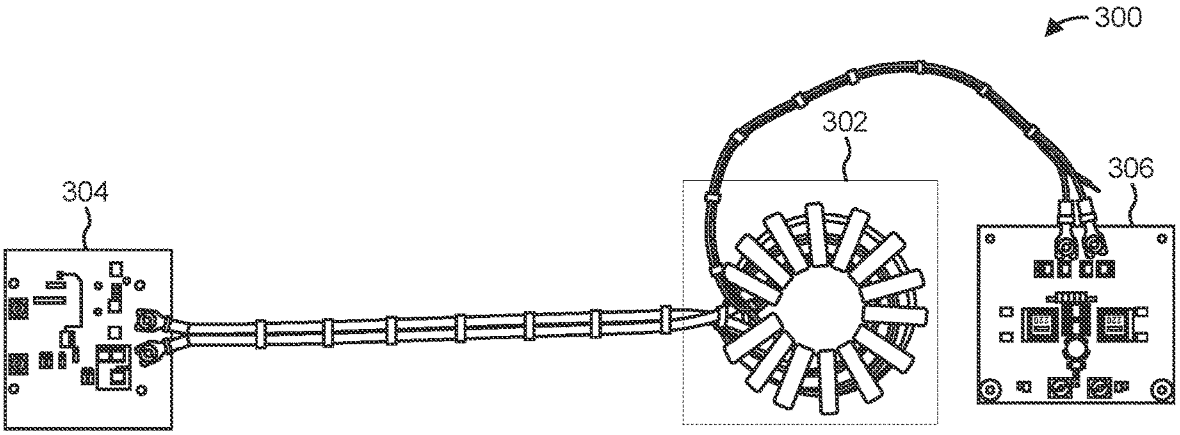
FIG. 3 illustrates an example of a half-bridge circuit.
Figure 5:
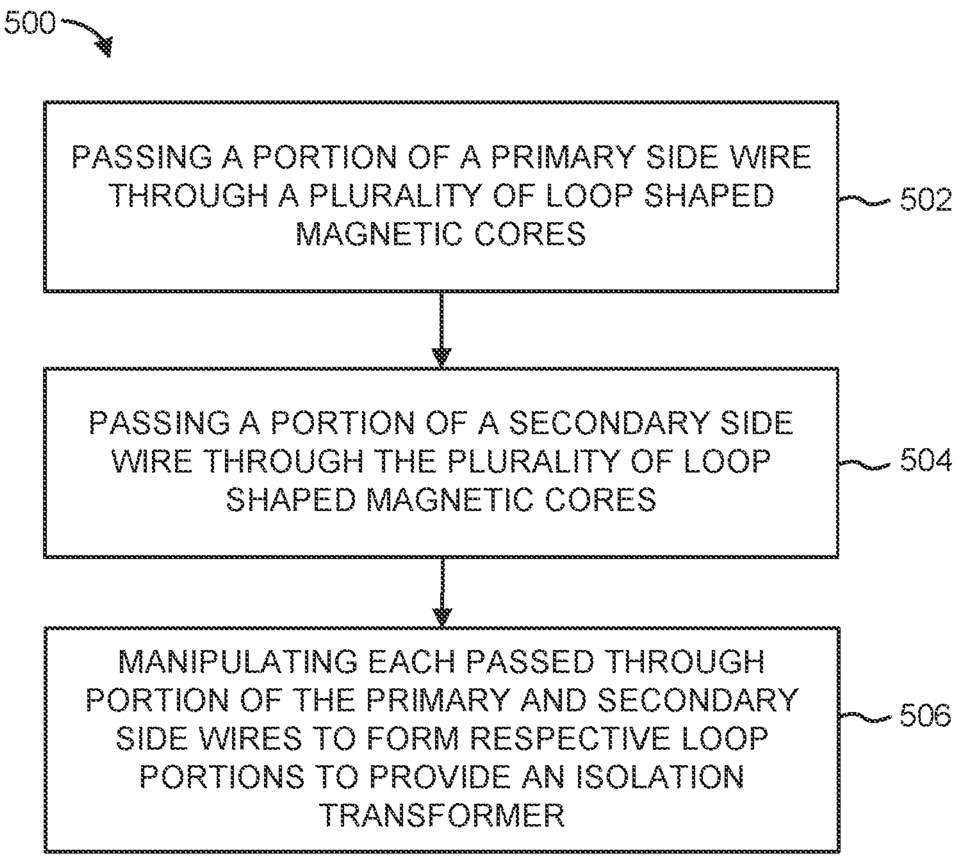
FIG. 5 illustrates an example of a method for forming an isolation transformer.

FIG. 3 illustrates an example of a half-bridge circuit 300. In some examples, the half-bridge circuit 300 can be used in a DC-to-DC converter topology. The half-bridge circuit 300 can include an isolation transformer 302 having ferrite magnetic cores. In some examples, the isolation transformer 302 can correspond to the isolation transformer 100, as illustrated in FIG. 1. In additional or alternative examples, the ferrite magnetic cores of the isolation transformer 302 can correspond to toroid cores, such as ZF42507TC from Magnetics Inc. In some examples, the ferrite magnetic cores can correspond to the plurality of magnetic cores 130, as illustrated in FIG. 1. In some examples, the isolation transformer 302 can be formed (e.g., according to methods described herein, such as a method 500, as illustrated in FIG. 5) with a primary side wire (e.g., the primary side wire 102, as illustrated in FIG. 1) having an insulation thickness that can withstand given voltage stresses and is greater than an insulation thickness of a secondary side wire (e.g., the secondary side wire 104, as illustrated in FIG. 1) of the isolation transformer. In some examples, the primary side wire can include 60 kV rate wire.

By way of further example, the half-bridge circuit 300 includes a driver 304 and an output rectifier 306. As illustrated in FIG. 3, the driver 304 can be physically isolated from the output rectifier 306 by the isolation transformer 302. The driver 304 can be configured to output a voltage to the isolation transformer 302. The isolation transformer 302 can provide the voltage to the output rectifier 306 for voltage rectification. During operation, the half-bridge circuit 300 can exhibit about 90% circuit efficiency in an about 30 Watt (W) range similar or substantially similar (e.g., within about 5% to about 10% or less) to half-bridge circuits configured with potted isolation transformers.

Figure 4:
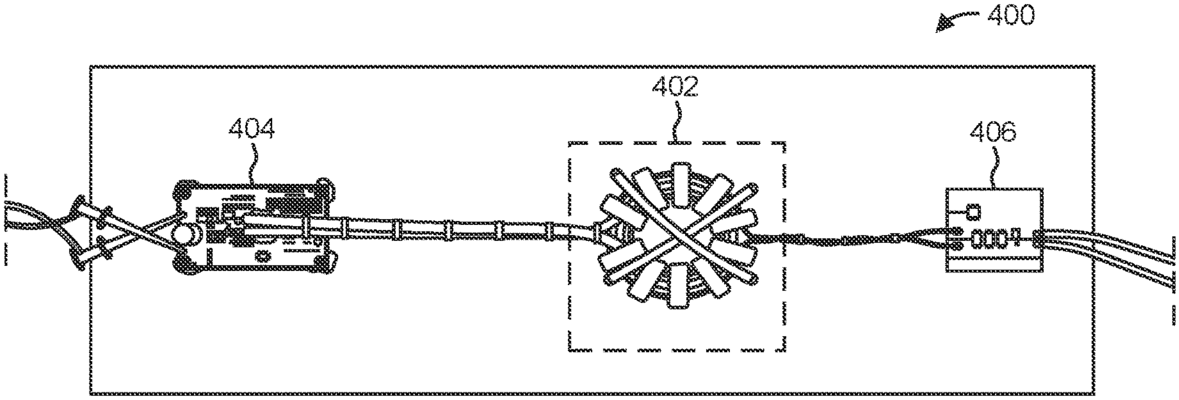
FIG. 4 illustrates an example of a flyback converter circuit.

FIG. 4 illustrates an example of a flyback converter circuit 400. In some examples, the flyback converter circuit 400 can be used in a DC-to-DC converter topology. The flyback converter circuit 400 can include an isolation transformer 402 with molypermalloy powder (MMP) magnetic cores as coupling inductors. In some examples, the isolation transformer 402 can correspond to the isolation transformer 200, as illustrated in FIG. 2. In additional or alternative examples, the MMP magnetic cores of the isolation transformer 402 can correspond to toroid cores, such as C055925A2, manufactured by Magnetics Inc. In some examples, the MMP magnetic cores can correspond to the plurality of magnetic cores 226, as illustrated in FIG. 2. In some examples, the isolation transformer 402 can be formed (e.g., according to methods described herein, such as a method 500, as illustrated in FIG. 5) with a primary side wire (e.g., the primary side wire 202, as illustrated in FIG. 1) having an insulation thickness that can withstand given voltage stresses and is greater than an insulation thickness of a secondary side wire (e.g., the secondary side wire 204, as illustrated in FIG. 1) of the isolation transformer. In some examples, the primary side wire can include 60 kV rate wire.

By way of further example, the flyback converter circuit 400 can include a flyback controller 404 and an output rectifier 406. As illustrated in FIG. 4, the flyback controller 404 can be physically isolated from the output rectifier 406 by the isolation transformer 402. The flyback controller 404 can be configured to output a voltage to the isolation transformer 402. The isolation transformer 402 can provide the voltage to the output rectifier 406 for voltage rectification. During operation, the flyback converter circuit 400 can exhibit about an 83% efficiency in an about 30 W range similar or substantially similar (e.g., within about 5% to about 10% or less) to flyback converter circuits configured with potted isolation transformers.

Figure 6:
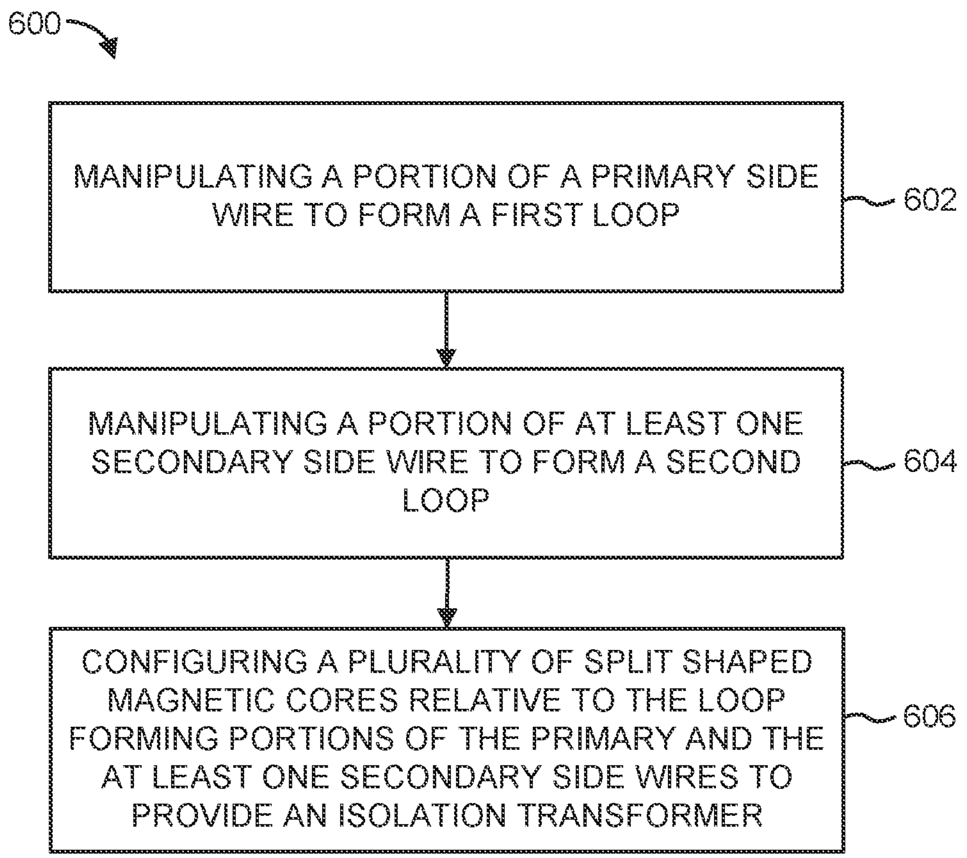
FIG. 6 illustrates another example of a method for forming an isolation transformer.

In view of the foregoing structural and functional features described above, example methods will be better appreciated with references to FIGS. 5-6. While, for purposes of simplicity of explanation, the example method of FIGS. 5-6 is shown and described as executing serially, it is to be understood and appreciated that the example method is not limited by the illustrated order, as some actions could in other examples occur in different orders, multiple times and/or concurrently from that shown and described herein.

FIG. 5 illustrates an example of a method 500 for forming an isolation transformer. In some examples, the isolation transformer can correspond to the isolation transformer 100, as illustrated in FIG. 1 or the isolation transformer 200, as illustrated in FIG. 2. The method 500 can begin at 502, by passing a loop forming portion of a primary side wire having a first wire thickness (e.g., an insulation thickness) through a plurality of loop shaped magnetic cores. The first wire thickness of the primary side wire can define a voltage isolation level of the isolation transformer. In some examples, the primary side wire can correspond to the primary side wire 102, as illustrated in FIG. 1 or the primary side wire 202, as illustrated in FIG. 2. In additional or alternative examples, the plurality of loop shaped magnetic cores can correspond to the plurality of loop shaped magnetic cores 130, as illustrated in FIG. 1 or the plurality of loop shaped magnetic cores 226, as illustrated in FIG. 2.

At 504, a loop forming portion of a secondary side wire having a second wire thickness can be passed through each of the plurality of loop shaped magnetic cores. The second wire thickness can be less than the first wire thickness. In some examples, the secondary side wire can correspond to the secondary side wire 104, as illustrated in FIG. 1 or the secondary side wire 204, as illustrated in FIG. 2. At 506, each loop forming portion of the primary and secondary side wires passed through each of the plurality of loop shaped magnetic cores can be manipulated (e.g., via a machine, by hand of a user, etc.) to form respective primary and secondary side wire loop portions to provide the isolation transformer. In some examples, the respective primary and secondary side wire loop portions can correspond to the primary and secondary side wire loop portions 106, 108, 120, as illustrated in FIG. 1 or the primary and secondary side wire loop portions 206, 218, as illustrated in FIG. 2.

FIG. 6 illustrates another example of a method 600 for forming an isolation transformer. In some examples, the isolation transformer can correspond to the isolation transformer 100, as illustrated in FIG. 1 or the isolation transformer 200, as illustrated in FIG. 2. The method 600 can begin at 602, by manipulating a portion of a primary side wire having a first wire thickness to form a first loop. The first wire thickness of the primary side wire can define a voltage isolation level of the isolation transformer. In some examples, the primary side wire can correspond to the primary side wire 102, as illustrated in FIG. 1 or the primary side wire 202, as illustrated in FIG. 2.

At 604, manipulating a portion of at least one secondary side wire having a second wire thickness to form a second loop. In some examples, the at least one secondary side wire can correspond to the secondary side wire 104, as illustrated in FIG. 1 or the secondary side wire 204, as illustrated in FIG. 2. The second wire thickness can be less than the first wire thickness. At 606, configuring a plurality of split shaped magnetic cores to substantially (e.g., completely or less than completely) surround the portions of each of the primary and the at least one secondary side wires along a circumference of the portions of each of the primary and the at least one secondary side wires to provide the isolation transformer. In additional or alternative examples, the plurality of split shaped magnetic cores can correspond to the plurality of magnetic cores 130, as illustrated in FIG. 1 or the plurality of magnetic cores 226, as illustrated in FIG. 2. By way of example the portions of each of the primary and the at least one secondary side wires forming the first and second loops, respectively, can correspond to the primary and secondary side wire loop portions 106, 108, 120, as illustrated in FIG. 1 or the primary and secondary side wire loop portions 206, 218, as illustrated in FIG. 2, respectively.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for forming an isolation transformer, the method comprising:

passing a loop forming portion of a primary side wire having a first wire thickness through at least three loop shaped magnetic cores, the at least three loop magnetic cores substantially evenly spaced around a respective portion of the loop forming portion of the primary side wire along a respective circumference of the primary side wire;

passing a loop forming portion of a secondary side wire having a second wire thickness through the at least three loop shaped magnetic cores, the at least three magnetic cores substantially evenly spaced around a respective portion of the loop forming portion of the secondary side wire along a respective circumference of the secondary side wire; and manipulating each loop forming portion of the primary and secondary side wires passed through the at least three loop shaped magnetic cores to form respective primary and secondary side wire loop portions to provide the isolation transformer.

2. The method of claim 1, further comprising conjoining a pair of side loop tail portions of each of the primary and secondary side wires to retain the respective primary and secondary side wire loop portions in a loop arrangement to provide the isolation transformer.

3. The method of claim 2, wherein the second wire thickness can be different than the first wire thickness, and the first wire thickness of the primary side wire defines a voltage isolation level for the isolation transformer from a primary electrical source or load.

4. The method of claim 3, further comprising:

selecting a first insulated wire among a plurality of insulated wires as the primary side wire, wherein each of the plurality of insulated wires have different insulation thicknesses; and selecting a second insulated wire among the plurality of insulated wires as the secondary side wire.

* * * * *